United States Patent
Matsugami et al.

(10) Patent No.: US 12,333,185 B2
(45) Date of Patent: Jun. 17, 2025

(54) STORAGE SYSTEM AND DATA RESTORATION METHOD

(71) Applicant: Hitachi, Ltd., Tokyo (JP)

(72) Inventors: Kazuki Matsugami, Tokyo (JP); Akira Deguchi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 521 days.

(21) Appl. No.: 17/691,253

(22) Filed: Mar. 10, 2022

(65) Prior Publication Data

US 2023/0113507 A1    Apr. 13, 2023

(30) Foreign Application Priority Data

Sep. 30, 2021 (JP) .................................. 2021-160452

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0631* (2013.01); *G06F 3/0664* (2013.01); *G06F 3/0673* (2013.01); *G06F 12/0238* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 10,592,352 B1 | 3/2020 | Tanaka et al. | |
| 10,795,588 B1 * | 10/2020 | Yadav ................. | G06F 11/1451 |
| 10,853,184 B1 * | 12/2020 | Tsaur .................. | G06F 11/1464 |
| 2004/0236868 A1 * | 11/2004 | Martin ................ | G06F 11/1469 709/245 |
| 2007/0124366 A1 * | 5/2007 | Shobayashi ............ | G06F 3/067 709/203 |
| 2010/0333116 A1 * | 12/2010 | Prahlad ................... | G06F 3/067 713/153 |
| 2013/0326117 A1 * | 12/2013 | Aune ...................... | G06F 3/064 711/E12.008 |
| 2020/0341658 A1 * | 10/2020 | Hebsur ................... | G06F 3/065 |
| 2021/0149771 A1 * | 5/2021 | Wilcock ............. | G06F 11/1469 |

* cited by examiner

*Primary Examiner* — Stephanie Wu
(74) *Attorney, Agent, or Firm* — Baker Botts, L.L.P.

(57) ABSTRACT

This invention prevents valid data written from a healthy host from being lost when restoring data corrupted by a host infected by malware from a backup. In the disclosed storage system, a storage controller records history of data updates to data in volumes made by hosts (host computers) as update history information (an update history management table) with information that can identify the hosts respectively. When having been requested to restore data in a particular volume of the volumes with specifications of a host for which to invalidate data updates and a date and time to do so, based on the update history information, the storage controller invalidates data updates made by the specified host after the specified date and time, whereas keeping data updates valid made by a host different from the specified host after the specified date and time, and restores the particular volume.

12 Claims, 10 Drawing Sheets

[UPDATE HISTORY MANAGEMENT TABLE]    240

| 241 UPDATE HISTORY ACQUISITION PERIOD | 242 HOST THAT REGISTERED DATA | 243 LOGICAL ADDRESS | 244 PHYSICAL ADDRESS BEFORE UPDATE | 245 HOST THAT REGISTERED DATA BEFORE UPDATE | 246 PHYSICAL ADDRESS AFTER UPDATE | 247 DATA SIZE |
|---|---|---|---|---|---|---|
| 03/23/21 13:00 TO 03/24/21 13:00 | VM1 | 0x00000001 | 0x00000010 | VM1 | 0x00000100 | 4KB |
| | | 0x00000002 | 0x00000020 | VM1 | 0x00000200 | 4KB |
| | | 0x00000003 | 0x00000030 | VM1 | 0x00000300 | 4KB |
| | | ... | ... | ... | ... | ... |
| | VM2 | 0x10000001 | 0x10000010 | VM2 | 0x10000100 | 4KB |
| | | 0x10000002 | — | — | 0x10000200 | 4KB |
| | | 0x10000003 | 0x10000030 | VM2 | 0x10000300 | 4KB |
| | | ... | ... | ... | ... | ... |
| | VM3 | 0x20000001 | 0x20000010 | VM3 | 0x20000100 | 4KB |
| | | 0x20000002 | — | — | 0x20000200 | 4KB |
| | | 0x20000003 | — | — | — | 4KB |
| | | ... | ... | ... | ... | ... |
| ... | ... | ... | ... | ... | ... | ... |

FIG. 3

[VOLUME INFORMATION MANAGEMENT TABLE] 210

| VOLUME ID | VOLUME SIZE | SNAPSHOT SETTING | SNAPSHOT MANAGEMENT TABLE ID | SNAPSHOT ACQUISITION CONDITION |
|---|---|---|---|---|
| 0x0001 | 256GB | ENABLED | 0x0001 | 13:00 ON WEEKDAYS |
| 0x0002 | 512GB | ENABLED | 0x0002 | 12:00 ON EVERY SATURDAY |
| 0x0003 | 512GB | DISABLED | — | — |
| ... | ... | ... | ... | ... |

[LOGICAL-PHYSICAL MAPPING TABLE] 220

| LOGICAL ADDRESS | PHYSICAL ADDRESS | DATA SIZE | HOST THAT REGISTERED DATA |
|---|---|---|---|
| 0x00000001 | 0x00000001 | 4KB | VM1 |
| 0x00000002 | 0x00000002 | 4KB | VM1 |
| 0x00000003 | 0x00000003 | 4KB | VM1 |
| ... | ... | ... | |

[SNAPSHOT MANAGEMENT TABLE]  230

| SNAPSHOT ACQUISITION TIME (231) | LOGICAL ADDRESS (232) | PHYSICAL ADDRESS (233) | DATA SIZE (234) |
|---|---|---|---|
| 03/23/21 13:00 | 0x00000001 | 0x00000010 | 4KB |
| | 0x00000002 | 0x00000020 | 4KB |
| | 0x00000003 | 0x00000030 | 4KB |
| | ... | ... | ... |
| 03/24/21 13:00 | 0x00000001 | 0x00000100 | 4KB |
| | 0x00000002 | 0x00000200 | 4KB |
| | 0x00000003 | 0x00000300 | 4KB |
| | ... | ... | ... |
| ... | ... | ... | ... |

FIG. 6

[UPDATE HISTORY MANAGEMENT TABLE]                                                                    240

| UPDATE HISTORY ACQUISITION PERIOD | HOST THAT REGISTERED DATA | LOGICAL ADDRESS | PHYSICAL ADDRESS BEFORE UPDATE | HOST THAT REGISTERED DATA BEFORE UPDATE | PHYSICAL ADDRESS AFTER UPDATE | DATA SIZE |
|---|---|---|---|---|---|---|
| 03/23/21 13:00 TO 03/24/21 13:00 | VM1 | 0x00000001 | 0x00000010 | VM1 | 0x00000100 | 4KB |
| | | 0x00000002 | 0x00000020 | VM1 | 0x00000200 | 4KB |
| | | 0x00000003 | 0x00000030 | VM1 | 0x00000300 | 4KB |
| | | … | … | … | … | … |
| | VM2 | 0x10000001 | 0x10000010 | VM2 | 0x10000100 | 4KB |
| | | 0x10000002 | — | — | 0x10000200 | 4KB |
| | | 0x10000003 | 0x10000030 | VM2 | 0x10000300 | 4KB |
| | | … | … | … | … | … |
| | VM3 | 0x20000001 | 0x20000010 | VM3 | 0x20000100 | 4KB |
| | | 0x20000002 | — | — | 0x20000200 | 4KB |
| | | 0x20000003 | — | — | — | 4KB |
| | | … | … | … | … | … |
| … | … | … | … | … | … | … |

241　242　243　244　245　246　247

STORAGE SYSTEM AND DATA RESTORATION METHOD

BACKGROUND

The present invention relates to a storage system and a data restoration method and is favorable and suitable for application to a storage system and a data restoration method for restoring data corrupted by a malware infected host from a backup.

In recent years, amounts of investment for security and backup tend to increase because of an increase in damage caused by malware typified by Ransomeware. A new technology regarding detection of infected data and data restoration is demanded and block storage backup functionality is expected to be functionally enhanced against malware.

For example, U.S. Pat. No. 10,592,352 discloses a scheme in which backup data that a backup system acquired is separated from the backup system by copying such data using a local copy function of a storage and retained across multiple generations.

SUMMARY

In a system comprised of a storage and a plurality of hosts, if one host is infected by malware, there is a possibility that a volume accessible from the infected host suffers from data corruption caused by malware, even though infection between hosts is prevented by firewall. However, in a case where data has been corrupted in this situation, the above-mentioned scheme of conventional technology restores corrupted data to data existing at a point of time when a backup was performed. Therefore, all pieces of data registered after the backup, including data on healthy hosts supposed to be prevented from infection, will be lost. In other words, erasure of data, not only data written from a host infected by malware, also including data written from a healthy host, posed a problem as follows: if discovery of infection is delayed, the impact will expand and a large amount of valid data will be lost.

The present invention has been developed in view of the above-noted point and is intended to propose a storage system and a data restoration method enabling it to prevent valid data written from a health host from being lost when restoring data corrupted by a host infected by malware from a backup.

In the present invention to solve the foregoing problem, there is provided a storage system comprising a storage device and a storage controller and providing volumes into which storage areas of the storage device are virtualized to a plurality of hosts by the storage controller. The storage controller records history of data updates to data in the volumes made by the hosts as update history information with information that can identify each of the hosts. When having been requested to restore data in a particular volume of the volumes with specifications of a host for which to invalidate data updates and a date and time to do so, based on the update history information, the storage controller invalidates data updates made by the specified host in the particular volume after the specified date and time, whereas keeping data updates valid made by a host different from the specified host in the particular volume after the specified date and time, and restores the particular volume.

In the present invention to solve the foregoing problem, there is also provided a data restoration method that is performed by a storage system comprising a storage device and a storage controller and providing volumes into which storage areas of the storage device are virtualized to a plurality of hosts by the storage controller. The data restoration method comprises an update history recording step in which the storage controller records history of data updates to data in the volumes made by the hosts as update history information with information that can identify each of the hosts and a data restoring step in which, when having been requested to restore data in a particular volume of the volumes with specifications of a host for which to invalidate data updates and a date and time to do so, based on the update history information, the storage controller invalidates data updates made by the specified host in the particular volume after the specified date and time, whereas keeping data updates valid made by a host different from the specified host in the particular volume after the specified date and time, and restores the particular volume.

According to the present invention, it is possible to prevent valid data written from a healthy host from being lost when restoring data corrupted by a host infected by malware from a backup.

BRIEF DESCRIPTION OF THE DRAWINGS

FIG. 3 is a diagram representing an example of a volume information management table 210.

FIG. 4 is a diagram representing an example of a logical-physical mapping table 220.

FIG. 5 is a diagram representing an example of a snapshot management table 230.

FIG. 6 is a diagram representing an example of an update history management table 240.

DETAILED DESCRIPTION

Figure 1:
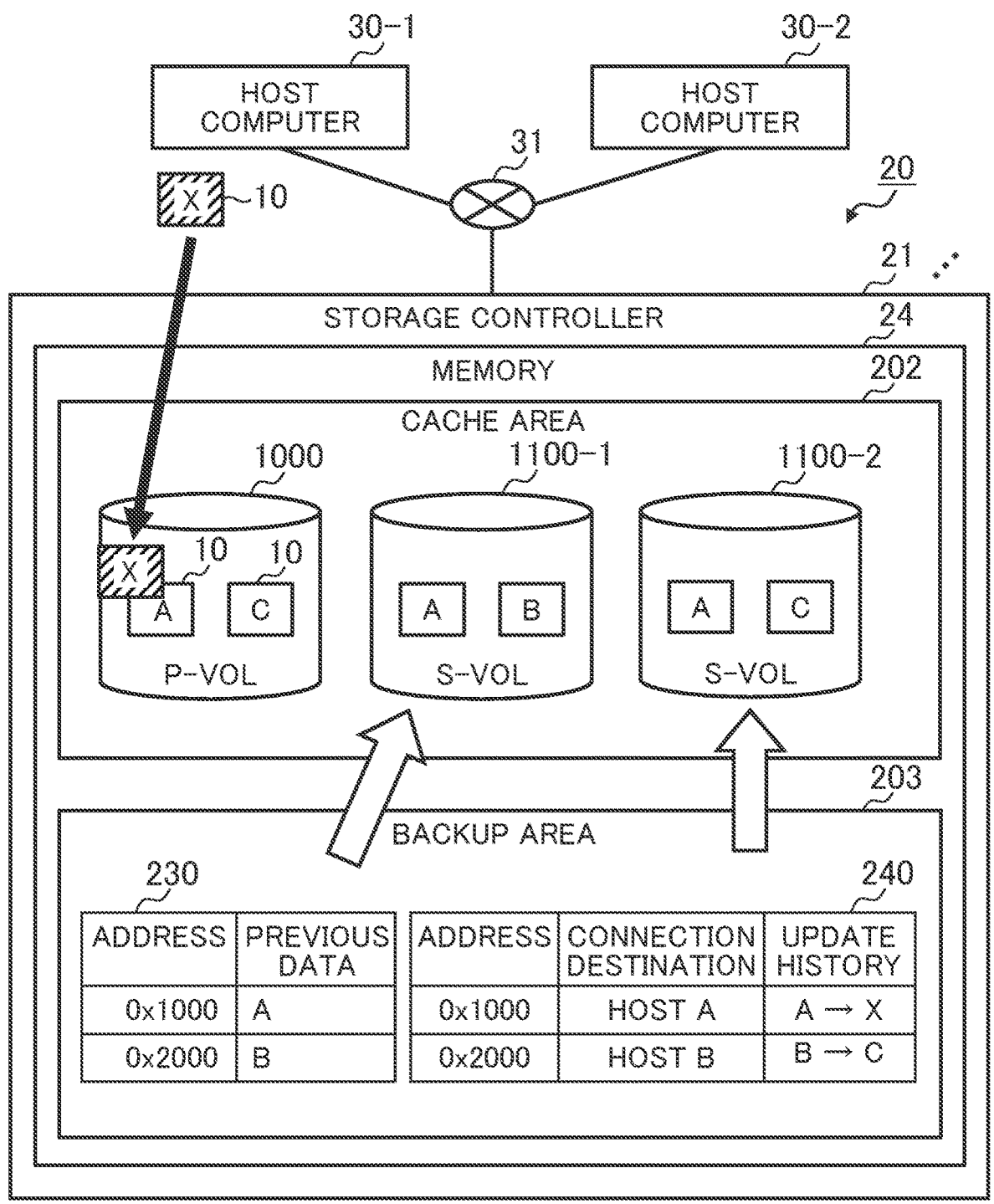
FIG. 1 is a diagram to explain one example (Part 1) of an image of restoring data by a storage system 20 pertaining to one embodiment of the present invention.

In the following, embodiments of the present invention will be detailed with reference to the drawings. Note that, in the following description, a reference numeral without a sub-number may commonly be used to describe like elements without individuating them, whereas a reference numeral with a sub-number may be used to describe like elements, individuating them. For example, we may write down "host computers 30" when describing the host computers without individuating them specifically, whereas we may write down a "host computer 30-1", a "host computer 30-2", and the like when describing them, individuating the respective host computers.

FIG. 1 is a diagram to explain one example (Part 1) of an image of restoring data by a storage system 20 pertaining to one embodiment of the present invention. FIG. 1 depicts a configuration example in which the storage system 20 is connected with a plurality of host computers 30.

The storage system 20 is a storage system that is configured comprising one or more storage controllers 21 and one or more drives 28 which are connected to each of the storage controllers 21 and is connected with the host computers 30 via a network 31; a detailed internal configuration thereof will be described later with referring to FIG. 2.

As depicted in FIG. 1, each storage controller 21 builds up logical volumes in a cache area 202 formed inside a memory 202; the logical volumes comprise one primary volume (P-VOL) 1000 and one or more secondary volumes (S-VOLs) 1100 into which physical storage areas of the each drive 28 are virtualized. The P-VOL 1000 is a primary volume that the storage system 20 uses ordinarily and the S-VOLs 1100 are secondary volumes that are used at restoring data in the P-VOL 1000. Note that the P-VOL 1000 and S-VOLs 1100 are, but not limited to, e.g., persistent volumes; however, they may be commonly used logical volumes. As for data 10 that is stored in each volume, each piece of data 10 is labeled "A", "B", "C", and "X" in FIG. 1 to individualize pieces of data 10. It should be noted that these pieces of data 10 may be referred to as data A, data B, data C, and data X in subsequent description.

Also, the storage controller 21 retains a snapshot management table 230 for managing snapshots of the respective volumes and an update history management table 240 for managing the history of updating data in each volume performed by access from a host computer 30 in a backup area 203 formed inside the memory 24. Detail on the snapshot management table 230 will be described later with referring to FIG. 5 and detail on the update history management table 240 will be described later with referring to FIG. 6.

The image of restoring data depicted in FIG. 1 is described below. Data 10 is written from a host computer 30-1 (host A) and a host computer 30-2 (host B) to the P-VOL 1000. In the P-VOL 1000, a logical address is only allocated to the data 10 and its real data is stored into a physical storage area on a storage device (a drive 28 or the memory 24). The logical address allocated to the data 10 is recognized from the host computers 30 and basically remains unchanged, unless a command is issued, inter alia, to create a volume or expand capacity. Moreover, a mapping relationship between a logical address allocated within the P-VOL 1000 and a physical address at which real data is stored in a storage area is managed as a predefined set of information (e.g., a logical-physical mapping table 220). Note that a destination of access from each host computer 30 to a volume is not specified in the case of FIG. 1. Also, a backup (snapshot) of the P-VOL 1000 is acquired on a per-volume basis by carrying out a periodic snapshot function. Specifically, a reference to the update history management table 240 exemplified in FIG. 1 indicates that the P-VOL 1000 was initially storing data A and B and a reference to the snapshot management table 230 indicates that the table has a snapshot acquired at that time.

Subsequently, according to the update history management table 240, data A is updated to data X by the host A and data B is updated to data C by the host B and it follows that data X and data C are stored in the P-VOL 1000 as presented in FIG. 1.

Then, suppose that the host A was infected by malware at timing after the above-mentioned snapshot was acquired and data X was written from the infected host A. On the other hand, suppose that the host B was not infected by malware and wrote data C at timing after the host A was infected by malware. Then, if data X was illegal data created by malware, there is a possibility that the original data A is corrupted by being updated to the data X. The data X may be encrypted. Therefore, the storage system 20 is required to shut off the access from the host A and restore the data in the P-VOL 1000 to rectify the data existing in the volume.

In this case, a conventional way of typical data restoration is to restore the affected data in an S-VOL 1100 using the snapshot acquired before the host A is infected by malware and, after verification that the data is free of abnormality, restore the data in the P-VOL 1000 by copying the restored data to the P-VOL 1000. However, because a snapshot records a data structure on a per-volume base, the entire volume data is restored with previous data in the conventional way of data restoration using snapshots. Specifically, an S-VOL 1100-1 depicted in FIG. 1 represents a structure of data in the S-VOL 1100 when restored by the conventional way of data restoration using snapshots. Looking at the S-VOL 1100-1 indicates that data A and data B are restored as per "previous data" recorded as the snapshot and the data X written as an update from the host A infected by malware is deleted. However, as discussed in the Summary section herein, in this conventional way of data storage, the data C written as an update from the healthy host B not infected by malware is also deleted (recovered back to the data B). Therefore, restoring data in this way involved a problem in which valid data is lost and data restoration takes time.

Therefore, to solve the above problem, the storage system 20 pertaining to the present invention is adapted to have the information set (the update history management table 240) for managing the history of updating data on a per-host base and sets apart an update performed by a host infected by malware based on the information set and carries out data restoration. In the case of the present example, data restoration is performed as follows: the data X written as an update from the host A infected by malware is only restored to the data A before being updated, exploiting a change/difference from the data structure of the snapshot, but the data C written as an update from the healthy host B is not deleted (not restored to the data B before being updated). An S-VOL 1100-2 depicted in FIG. 1 represents a structure of data in the S-VOL 1100 when restored in this way by the storage system 20 pertaining to the present embodiment. Looking at the S-VOL 1100-2 indicates that the data X is deleted and the affected data is restored as the data A, whereas the data C is maintained in a latest state, without being restored to the data B. Hence, copying the data structure as such existing in the S-VOL 1100-2 to the P-VOL 1000 makes it possible to restore the data corrupted by the host infected by malware in the P-VOL 1000 from the backup and prevent valid data written from the healthy host from being lost.

The foregoing is an overview of data restoration when the storage system 20 pertaining to the present embodiment restores data corrupted by the host infected by malware from the backup. In the following, the configuration and processes of the storage system 20 required to implement such data restoration is detailed.

Figure 2:
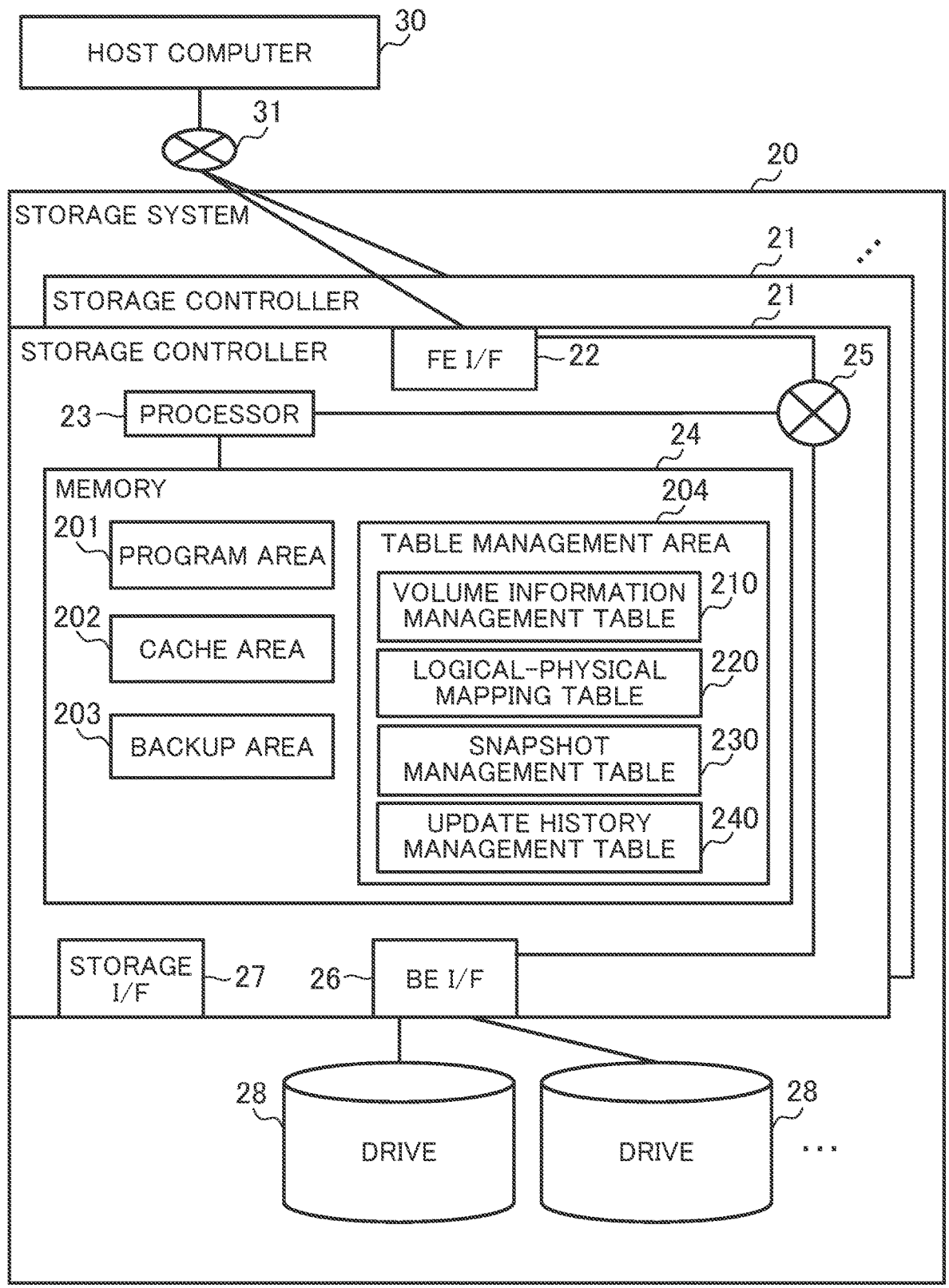
FIG. 2 is a block diagram depicting an example of an internal configuration of the storage system 20 pertaining to the present embodiment.

FIG. 2 is a block diagram depicting an example of an internal configuration of the storage system 20 pertaining to the present embodiment. The storage system 20 comprises one or more storage controllers 21 and one or more drives 28 and is communicably connected with a plurality of host computers 20 via a network 31.

As depicted in FIG. 2, each storage controller 21 comprises an FE I/F 22, a processor 23, a memory 24, a bus 25, a BE I/F 26, and a storage I/F 27.

The FE I/F 22 is a front end interface and, for example, performs data input and output operations (transmission and reception) between the storage controller and a host computer 30 via the network 31. On the other hand, the BE I/F 26 is a back end interface and, for example, performs input and output operations between the storage controller and a drive 28. The storage I/F 27 is an interface for closed communication within the storage system 20 (e.g., communication between controllers). Additionally, the bus 25 is a signal line to interconnect internal components of the storage controller 21.

The processor 23 is a processor such as a CPU (Central Processing Unit) and implements various programmed functions by executing programs retained in a storage device such as the memory 24.

The memory 24 is a storage device such as a RAM (Random Access Memory) and stores programs and data. The memory 24 internally includes a program area 201 to retain programs, a cache area 202 to retain cache data, a backup area 203 to retain backup data, and a table management area 204 to manage data in various tables (a volume information management table 210, a logical-physical mapping table 220, a snapshot management table 230, and an update history management table 240).

FIG. 3 is a diagram representing an example of the volume information management table 210. The volume information management table 210 is table data for managing a variety of information about each volume that the storage controller 21 provides and is stored in the table management area 204.

The volume information management table 210 has records per volume and contains data items in the following fields: e.g., volume ID 211, volume size 212, snapshot setting 213, snapshot management table ID 214, and snapshot acquisition condition 215.

The volume ID 211 denotes an identifier (volume ID) to uniquely identify a volume in a particular record. The volume size 212 denotes a capacity allocated to the volume. The snapshot setting 213 denotes setting a snapshot function "enabled" or "disabled" for the volume. The snapshot management table ID 214 denotes an identifier (snapshot management table ID) of a snapshot management table 206 that manages a snapshot of the volume. The snapshot acquisition condition 215 denotes a condition for acquiring a snapshot, which is set by, e.g., an administrator. If the snapshot setting 213 is "disabled", data items of the snapshot management table ID 214 and the snapshot acquisition condition 215 in the same record do not need to have a specific value.

FIG. 4 is a diagram representing an example of the logical-physical mapping table 220. The logical-physical mapping table 220 is table data for managing information about a mapping relationship (logical-physical mapping) between a logical address and a physical address for storing data and is stored in the table management area 204.

The logical-physical mapping table 220 has records in minimal units of data stored in a volume and contains data items in the following fields: e.g., logical address 221, physical address 222, data size 223, and host that registered data 224.

The logical address 221 denotes a logical address allocated to a volume relevant to data in a particular record. The physical address 222 is a physical address on a drive 28 or others mapped to the logical address 221 and, in other words, it denotes a physical address at which the data is stored. The data size 223 denotes data size of the data.

The host that registered data 224 denotes identification information of a host (access source host) that transmitted the data. Namely, the identification information of a host given in the field of the host that registered data 224 is information identifying a host that gets access to data. Note the following point: although any one of the host computers 30 is specified for the host that registered data 224 in the case of the system configuration of FIG. 2, connection destinations that connect to the storage system 20 pertaining to the present embodiment for inputting/outputting data to/from a volume are not limited to the host computers 30 and various connection destinations (hosts) can be registered according to the configuration of the storage system 20. In particular, for example, as in a configuration of FIG. 7 which will be described later, in a case where a plurality of virtual machines (VMs) is built in a host computer 30, identification information may be registered in units of virtual machines, as exemplified in FIG. 4; alternatively, identification information may be registered in units of containers or the like. Besides, a data access destination which is registered per host is not limited to a destination that is specified in units of volumes; for example, a destination may be specified in units of multiple virtual disk images (VMDKs) which are formed within a volume. Furthermore, when identifying the foregoing hosts or others, not only information on physical ports, also information on virtual ports may be used.

It should be noted that, in the following description, as a data write method in the storage system 20, an additional write method (log structure method) is adopted.

In the case of the additional write method, when data is updated, the storage controller 21 stores the data at a new physical address without changing a logical address. Upon doing so, in order to update the logical-physical mapping table 220, the storage controller 21 changes the physical address 222 mapped to the logical address 221 of the data after being updated from the old physical address to the new physical address, changes the data size 223 to data size of the data after being updated, and changes the host that registered data 224 to identification information of an access source host for the data update. On the other hand, data before being updated remains stored at the old physical address and is left behind in a garbage state and will be deleted when a garbage collection is performed; then, the old physical address will become free as an unused storage area. Moreover, in the update history management table 240 which will be described later with FIG. 6, as data update history, the storage controller 21 records logical and physical address mapping relationships before and after the update together with identification information of an access source host before and after the data update and others (which may include data size, data update time, etc.). In this way, along with a data update, an update is made of the logical-physical mapping table 220 and the update history management table 240. Thereby, the storage controller 21 is able to map multiple physical addresses to the logical address of each data that has been updated over time in managing data updates. Thus, it would become possible to restore desired data before an update in a rebuild process which will be described later.

Besides, a data write method in the present embodiment is not limited to the foregoing additional write method and any other method, e.g., a method of saving an update difference may be adopted. In the case of the method of saving an update difference, when data is updated, the storage controller 21 writes update data after copying and saving data before being updated and updates the logical-physical mapping table 220 and the update history management table 240. This enables it to manage a physical address to which the data is copied as information for restoration. At this time, a mapping relationship between a logical address and a physical address of the copy destination is usually made transparent for the host computers 30. Alternatively, as another method of saving an update difference, the storage controller 21 copies metadata relevant to data before being updated and save the data. Thereby, the storage controller may manage a logical address to which the metadata is copied as information for restoration.

As described in the foregoing context, even when any write method is adopted, even after data is updated, physical data being before updated remains without being erased promptly and, therefore, can be used for data restoration.

FIG. 5 is a diagram representing an example of the snapshot management table 230. The snapshot management table 230 is table data for managing information about snapshots and is stored in the table management area 204 in units of snapshots which are managed by snapshot management table ID 214.

The snapshot management table 230 contains data items in the following fields: e.g., snapshot acquisition time 231, logical address 232, physical address 233, and data size 234.

The snapshot acquisition time 231 denotes a date and time at which a snapshot was acquired. The logical address 232 denotes a logical address on a volume, assigned to data of which a snapshot was acquired. The physical address 233 denotes a physical address on a drive 28 at which the data preserved by the snapshot was stored (which is the physical address of the backup destination of the data). The data size 234 denotes data size of the data.

FIG. 6 is a diagram representing an example of the update history management table 240. The update history management table 240 is table data for managing data update history and is stored in the table management area 204.

The update history management table 240 contains data items in the following fields: e.g., update history acquisition period 241, host that registered data 242, logical address 243, physical address before update 244, host that registered data before update 245, physical address after update 246, and data size 247.

The update history acquisition period 241 denotes a period for which records of update history were acquired. The host that registered data 242 denotes identification information of a host that registered update data, by which an access source of update data can be identified. The update history acquisition period 241 is a period during which updates are recorded continuously and each record period can optionally be set. However, in the rebuild process which will be described later, a check is made of update history records from a snapshot that is set as a starting point of data restoration until start time of invalidation. For this reason, it is preferable that each record period is a period that is short enough not to exceed a periodic snapshot acquisition cycle period (more preferably, a period shorter than the snapshot acquisition cycle period). It is also preferable that, if a snapshot was acquired during such period, one record is divided and recorded. Besides, instead of or in addition to the update history acquisition period 241, the update time (update date and time) of each data update may be recorded. The logical address 243 denotes a logical address of update data on a volume. The physical address before update 244 denotes a physical address at which the data before being updated (updated data) was stored. The host that registered data before update 245 denotes identification information of a host that registered data before being updated. The physical address after update 246 denotes a physical address at which the update data was stored. The data size 247 denotes data size of the update data.

It should be noted that the update history management table 240 may be arranged to record all data updates as update history or record only data updates for which the host that registered data changes (data updates made by a different host from the previous access source host) as update history. In the case of the former, the amount of the table data may be reduced by dispensing with the fields of the physical address before update 244 and the host that registered data before update 245. In the case of the latter, the field of the physical address before update 244 cannot be dispensed with (the field of the host that registered data before update 245 can be dispensed with), but updates to be recorded as history become fewer than those of the former and, therefore, it is possible to shrink the amount of the table data.

Figure 7:
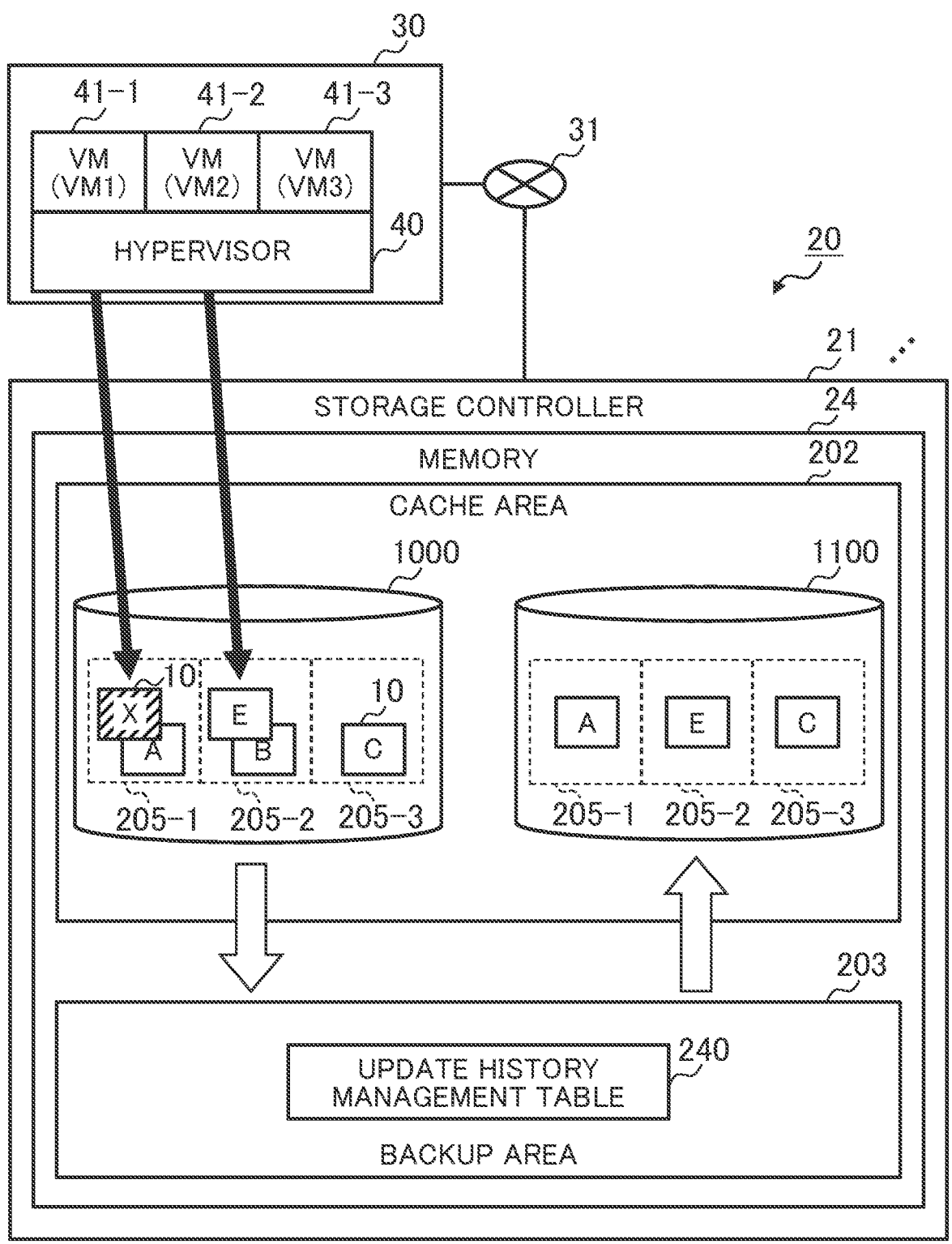
FIG. 7 is a diagram to explain one example (Part 2) of the image of restoring data by the storage system 20 in the present embodiment.

FIG. 7 is a diagram to explain one example (Part 2) of the image of restoring data by the storage system 20 in the present embodiment. FIG. 7 depicts a configuration example in which the storage system 20 is connected with a plurality of virtual machines 41. This configuration is arranged such that each host (virtual machine 41) gets access to each volume and a destination of access within a volume is specified in units of virtual disk images 205.

To explain in detail, in a host computer 30 in FIG. 7, a plurality of virtual machines (VMs) 41 is built on a hypervisor 40. Besides, in the storage controller 21, the data management area of each volume (a P-VOL 1000 and an SVOL 1100) is divided into a plurality of independent virtual disk images 205 and a virtual machine 41 that can get access to a virtual disk image is registered for each virtual disk image 205. In the case of FIG. 7, data 10 is written from a VM 41-1 (VM1) to a virtual disk image 205-1, data 10 is written from a VM 41-2 (VM2) to a virtual disk image 205-2, and data 10 is written from a VM 41-3 (VM3) to a virtual disk image 205-3.

A description is provided below about the image of restoring data in the example of linkage in the storage system 20 depicted in FIG. 7. Note that, as for a part that is as similar as described with FIG. 1, its detailed description is omitted. For example, data X is illegal data written as an update from a host (a VM1 in this example) infected by malware and may be encrypted, as is the case for FIG. 1.

In FIG. 7, the P-VOL 1000 was initially storing data A, B, and C. Subsequently, data A is updated to data X by a VM41-1 (VM1) registered as a source of access to a virtual disk image 201-5 and data B is updated to data E by a VM41-2 registered as a source of access to a virtual disk image 205-2. Note that it is assumed that the VM1 had been affected by malware when it transmitted the data X to the storage system 20.

When the situation as above has occurred, in order to rectify the data existing in the volume, the storage system 20 shuts off the access from the VM1 infected by malware to the virtual disk image 205-1 and restore the data in the P-VOL 1000 in such a manner that it selectively deletes the data X written as an update by the VM1 after being infected from the virtual disk image 205-1, based on the update history management table 240.

An S-VOL 1100 depicted in FIG. 7 represents a structure of data when restored by the storage system 20. Looking at the S-VOL 1100 indicates that the data A, updated before the VM1 is infected by malware, is only restored in the virtual disk image 205-1, whereas other virtual disk images 205-2 and 205-3 have data E and data C restored in a latest state.

Hence, copying the data structure as such existing in the S-VOL 1100 to the P-VOL 1000 makes it possible to restore the data corrupted by the host (VM1) infected by malware in the P-VOL 1000 from the backup and prevent valid data written from the healthy host (IM2, VM3) from being lost.

A description is provided below on various processes that are executed in the storage system 20 pertaining to the present embodiment.

Figure 8:
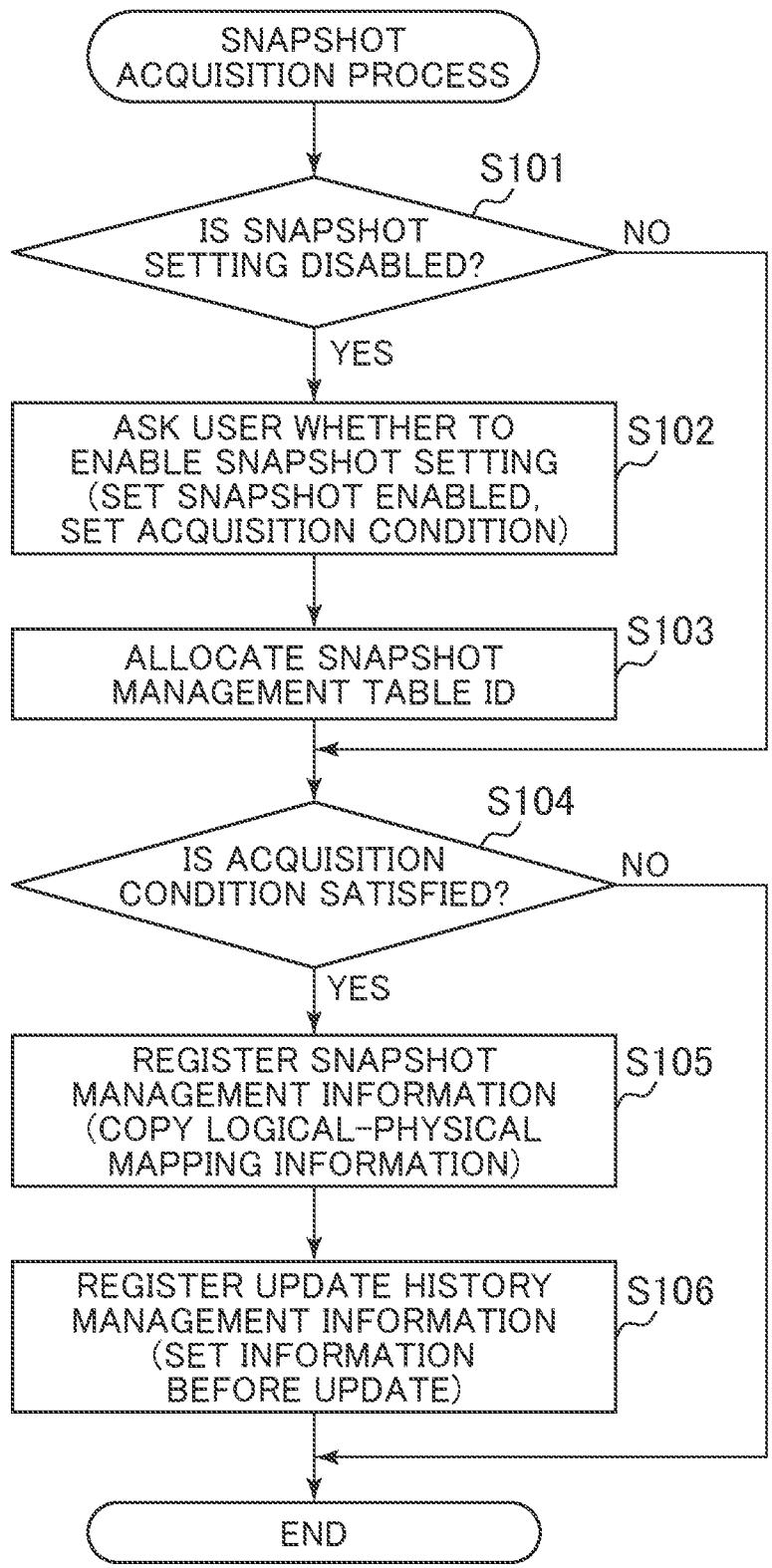
FIG. 8 is a flowchart illustrating a processing procedure example of a snapshot acquisition process.

FIG. 8 is a flowchart illustrating a processing procedure example of a snapshot acquisition process. The snapshot acquisition process is executed periodically, for example, and, in this process, the processor 23 stores snapshots according to the snapshot acquisition condition 215 setting retained in the volume information management table 210.

According to FIG. 8, the processor 23 first decides whether or not the snapshot function is set "disabled" (step S101) by referring to the snapshot setting 213 per volume (volume ID 211) in the volume information management table 210. If the snapshot function is "disabled" (YES at step S101), the process goes to step S102; if the snapshot function is "enabled" (NO at step S101), the process goes to step S104.

At step S102, the processor 23 asks the user (administrator) whether to enable the snapshot function. If an answer to enable the snapshot function has been returned, the processor sets "enabled" in the snapshot setting 213 field in the volume information management table 210 and sets a snapshot acquisition condition submitted in the snapshot acquisition condition 215 field. If an answer to enable the snapshot function has not been returned, the processor 23 terminates the snapshot acquisition process for the target volume. Note that processing of the steps S102 and S103 does not always have to be executed.

Next, the processor 23 allocates a snapshot management table ID for managing snapshots of the target volume to the volume and registers the allocated ID in the snapshot management table ID 214 field (step S103). Then, the process goes to step S104.

At step S104, the processor 23 decides whether or not the snapshot acquisition condition is satisfied by referring to the current date and time or the like. If the snapshot acquisition condition is satisfied (YES at step S104), the process goes to step S105 where the processors performs acquiring a snapshot of the target volume. Otherwise, if the snapshot acquisition condition is not satisfied (NO at step S104), the processor terminates the snapshot acquisition process for the target volume.

At step S105, the processor 23 creates a new record in the snapshot management table 230, records the current date and time in the snapshot acquisition time 231 field, and copies relevant information in the logical-physical mapping table 220 to the corresponding data fields (logical address 232, physical address 233, data size 234) in the snapshot management table 230.

Next, the processor registers information on data in the volume at the time of the snapshot acquisition as information before update in the update history management table 240 (step S106) and terminates the snapshot acquisition process. Specifically, the processor 23 searches the update history management table 240 for a record in which the current time is included in the history acquisition period 241 (if such record does not exist, the processor creates a new record). The processor registers the logical address 243, the physical address before update 244, and the host that registered data before update 245 into the record. In more detail, in the logical address 232 field and the physical address 233 field, the following are registered: the logical address 232 and the physical address 233 which have been registered into the snapshot management table 230 at step S105. In the field of the host that registered data before update 245, the following is registered: information of the host that registered data 224 in the logical-physical mapping table 220 which has been copied at step S105. Note that, as for the update history management table 240, it is preferable to close the update history acquisition period 241 at least each time a snapshot is acquired and, subsequently, create records in another update history acquisition period.

Figure 9:
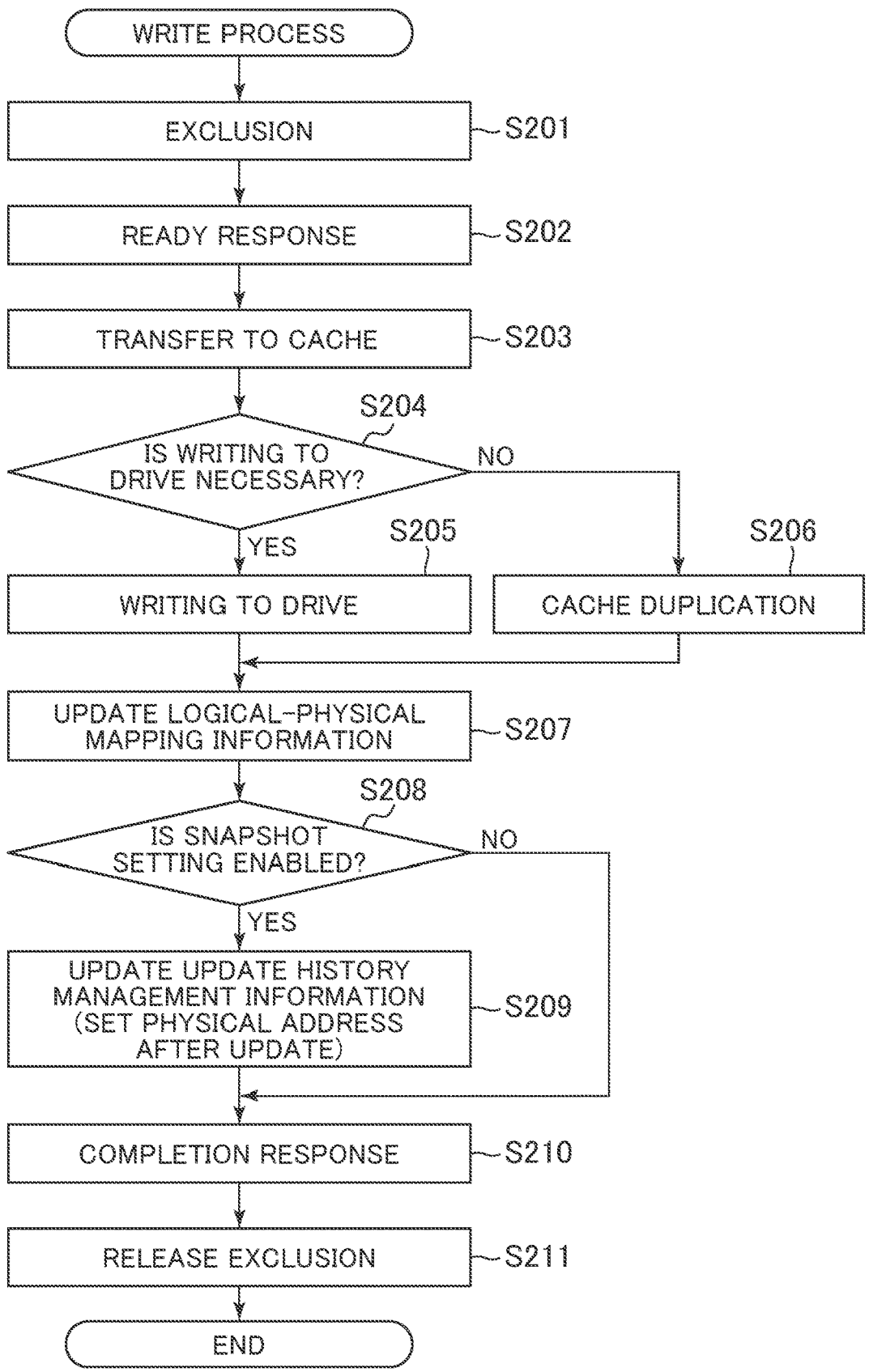
FIG. 9 is a flowchart illustrating a processing procedure example of a write process.

FIG. 9 is a flowchart illustrating a processing procedure example of a write process. The write process is executed when writing data to a volume from a host and started by the processor 23 when the FE I/F 22 of the storage controller 21 has received a write request from a host (e.g., a host computer 30 or a VM 41).

According to FIG. 9, the processor 23 first places the respective volumes under exclusive control (step S201) and sends a request source host a Ready response to the write request (step S202).

Next, the processor 23 transfers write data to the cache area 202 (step S203) and decides whether or not writing of the write data to a drive 28 is necessary (step S204). A decision as to whether or not the writing to a drive 28 is necessary at step S204 depends on cache control in the storage system 20 and a detailed description hereof is omitted.

If writing of the write data to a drive 28 is necessary, as decided at step S204 (YES at step S204), the processor writes the write data to a drive 28 (step S205) and the process goes to step S207.

Otherwise, if writing of the write data to a drive 28 is not necessary, as decided at step S204 (NO at step S204), the processor 23 mirrors a cache to which the write data has been written at step S203, thus duplicating the cache (step S206), and the process goes to step S207. Cache duplication in the storage controller 21 is common processing and a detailed description hereof is omitted.

At step S207, the processor 23 updates information in the logical-physical mapping table 220 based on the writing of the write data through the steps S203 to S206. By the way, as described for the logical-physical mapping table 220 of FIG. 4, because, inter alia, the additional write method or the method of saving an update difference is adopted as the data write method in the present embodiment, even when writing of write data (a data update) has been performed, physical data before being updated remains without being erased promptly and can be used for data restoration which will be described later.

Next, the processor 23 decides whether or not the snapshot setting is set "enabled" for the volume to which the write data has been written (step S208) by referring to the volume information management table 210. If the snapshot setting is enabled (YES at step S208), the process goes in order of step S209 and step 210; if the snapshot setting is disabled (NO at step S208), the process goes to step S210, skipping step S209.

At step S209, the processor 23 updates the update history management table 240 according to a result of the writing of the write data. Specifically, in a record having the logical address of the write data in the logical address 243 field, the processor registers the write destination address on the drive 28 or the memory 24 (cache) in the field of the physical address after update 246. Note that processing of the step S209 is intended to record an update difference resulting from a data write, but a setting not to register an update difference at all times may be set, taking performance degradation throughout the storage system 20 into consideration.

Then, the processor 23 sends the request source host a completion response to the write request at step S210, followed by releasing the exclusive control imposed at step S201 (step S211), and the write process terminates.

Figure 10:
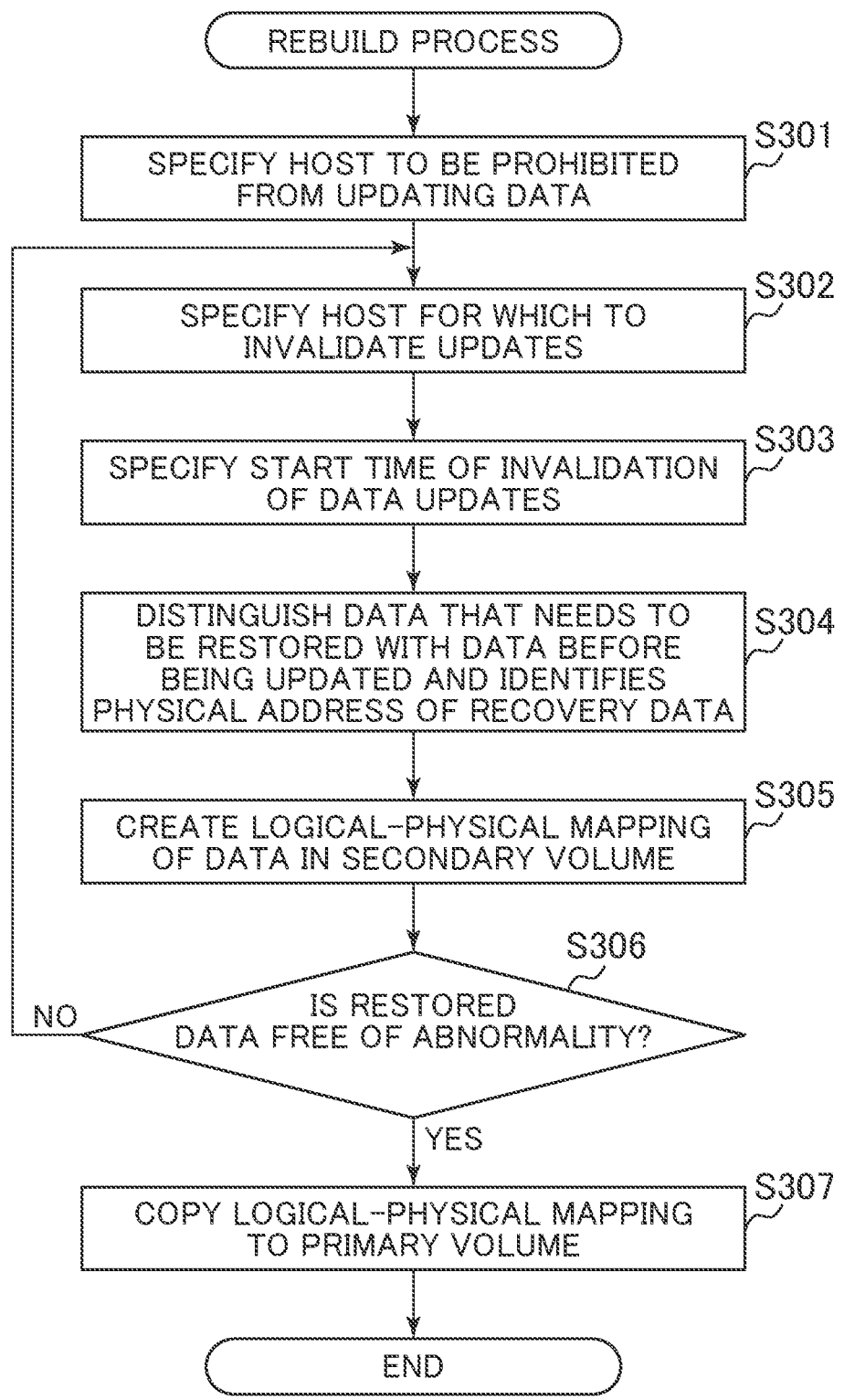
FIG. 10 is a flowchart illustrating a processing procedure example of a rebuild process.

FIG. 10 is a flowchart illustrating a processing procedure example of a rebuild process. In consideration of a situation where a host has been crashed, infected by malware, and data in a volume accessible from the host infected by malware has a risk of being corrupted by malware, the rebuild process is processing to restore the data in the volume to data before the host is infected by malware. It is detected that a host has been infected by malware by, e.g., virus detection software that the host user uses. By the way, data IO operations for the respective volumes are stopped at the start of the rebuild process.

According to FIG. 10, first, the user who is the administrator specifies a host (inter alia, a host computer 20 or a virtual machine 41) for which to invalidate data updates (step S301). A host that is specified at step S301 is, in particular, a host infected by malware and is also referred to as the specified host hereinafter.

Next, the user specifies start time of invalidation of data updates made by the specified host at step S301 (step S302). "Start time of invalidation" denotes timing of data that is desired to be restored by invalidating data updates made by the specified host and an optional time (date and time) can be specified. In the case of the present example, it is preferable that timing a little earlier than time at which the host is presumed to have been infected by malware is specified as the start time of invalidation.

Upon receiving what was specified in the foregoing steps S301 and S302, the processor starts the rebuild process. Here, in the storage system 20 pertaining to the present embodiment, the rebuild process can be executed by a plurality of methods. Processing of step S303 and subsequent steps illustrated in FIG. 10 corresponds to a processing procedure of one of these methods (a first method). Then, a description is first provided below about the rebuild process by the first method pursuant to FIG. 10.

When a host for which to invalidate data updates and the start time (date and time) of the invalidation have been specified, the first method sets a snapshot acquired before the specified date and time as a starting point of data restoration and restores data updated from the specified host after the specified date and time to data in a state before being updated through the use of the update history management table 240.

According to the first method, the processor 23 first selects one snapshot to be set as the "starting point of data restoration (of data for which updates made are invalidated)" from among snapshots acquired before the start time of invalidation specified at step S302 by referring to the snapshot management table 230 (step S303). Note that, in consideration of the processing load for specifying recovery data, which will be described later, it is preferable that a snapshot acquired at a relatively short time before the start time of invalidation is selected as the "starting point of data restoration".

Next, for all pieces of data to which a logical address was allocated in the current volume (P-VOL 1000), the processor 23 distinguishes between data that needs to be restored with data before being updated (that is also referred to as "data of a first category" hereinafter) and data that does not need to be restored with data before being updated (that is also referred to as "data of a second category" hereinafter) for each host that wrote a data update (host that registered data), based on the host specified at step S301 and the update history records in the update history management table 240. Note that data of the second category only does not need to restored with data before being updated, but such data is not unrestored in the rebuild process and restored with current data in a latest state, as will be described later, in the first method. Moreover, for data of the first category distinguished, the processor 23 identifies a physical address of recovery data to restore such data (i.e., data before being updated) (step S304), based on the start time of invalidation specified at step S302.

Data of the first category which is distinguished at step S304 is data updated by the specified host after the start time of invalidation. Such data is data X in the P-VOL 1000 in the example of FIG. 1 and data X in the virtual disk image 205-1 in the example of FIG. 7. The first method enables it to distinguish such data of the first category in particular by referring to the update history management table 240 and searching for update history records for which the host that registered data 242 is the specified host among update history records recorded within a period from the start time of invalidation until the current time.

Additionally, recovery data which is identified at step S304 to restore data of the first category is data before being updated immediately before the start time of invalidation. The first method sets the data structure of the snapshot selected at step S303 as the starting point and identifies the physical address of the recovery data. Specifically, the processor refers to the update history management table 240 and searches for an update history record of data of the first category if existing within a period from the acquisition time of the snapshot (see snapshot acquisition time 231 in FIG. 5) to the start time of invalidation. If one or more such update history records exist in that period, with respect to each logical address (logical address 243) of each piece of data belonging to data of the first category, the processor identifies a physical address after update 246 in an update history record recorded at the shortest interval before the start time of invalidation as the physical address mapped to the logical address (i.e., the physical address of the recovery data). To supplement, a logical address allocated to each piece of volume data is not changed by a data update. If no "such update history record" mentioned above exists within that period, for all logical addresses allocated to the pieces of data of the first category, the processor identifies a physical address (see physical address 233 in FIG. 5) given in the data structure of the snapshot set as the starting point of data restoration as the physical address mapped to each of the logical addresses (i.e., the physical address of the recovery data).

By identifying the logical address and the physical address of the recovery data as above at step S304, data updates of data of the first category after the snapshot acquisition time until the start time of invalidation can be reflected in the recovery data. Besides, the first method sets a snapshot as the starting point and searches for recovery data; this can reduce the time and load required for searching in comparison with a case of searching recovery data back from a data structure in a latest state.

Next, the processor 23 creates logical-physical mapping of data in a secondary volume (e.g., an S-VOL 1100) to restore data (step S305). Note that the processor 23 executes processing of the step S305 differently for data of the first category which needs to be restored with data before being updated and for data of the second category which does not need to be restored with data before being updated (data for which the access source is not changed to the specified host infected by malware after the start time of invalidation, in particular, data in virtual disk images 205-2, 205-3 in the example of FIG. 7), as will be described below.

For data of the first category, at step S305, the processor 23 restores data of the first category in the secondary volume by searching the logical-physical mapping table 220 for a logical address with keys of the host specified at step S301 and a logical address of data of the first category distinguished at step S304 and recording a physical address of recovery data identified at step S304 in association with the logical address.

For data of the second category, the processor creates logical and physical address mapping in the secondary volume by using a combination of a logical address 243 and a physical address after update 246 in a latest record in the update history management table 240 (or referring to logical-physical mapping of the current data which is managed in the logical-physical mapping table 220). By this mapping, in the secondary volume, data of the second category accessed from a host not infected by malware (in other words, data not accessed from the host infected by malware after the start time of invalidation) is restored as a latest data structure.

Next, the processor 23 asks the administrator to confirm whether data restored in the secondary volume at step S305 is free of abnormality (step S306). If it has been confirmed that the data in the secondary volume is free of abnormality (the data is normal) (YES at step S306), the process goes to step S307. Otherwise, if it has been confirmed that the data in the secondary volume suffers from abnormality (NO at step S306), the process returns to step S302, since a possibility that the start time of invalidation specified at step S302 is too late (after the specified host has already been infected by malware) is conceivable. Upon returning to step S302, the processor may prompt the administrator to specify another start time of invalidation (preferably, data and time before the currently specified date and time) or the processor 23 may set the start time of invalidation a little before the currently specified date and time (e.g., at one cycle period of snapshot acquisition before the currently specified date and time) and execute processing at step S303 and subsequent steps.

Then, at step S307, the processor 23 copies the logical and physical mapping created in the secondary volume to the primary volume (e.g., the P-VOL 1000) and terminates the rebuild process. By processing of step S307, data in the secondary volume with data to which data updated by the infected host has been restored is copied to the primary volume and data restoration is duly complete.

Through the execution of the rebuild process by the first method as described above, the storage system 20 deletes data corrupted by a host infected by malware using a change difference from a snapshot acquired before the infection (restoring such data back to normal previous data) and restores valid data written from a healthy host as such being kept in a latest state. In other words, the storage system 20 enables the restoration to data before the infection in such a manner that it selectively deletes only data that is likely to be updated from a host infected by malware and the restoration of data updated from a healthy host after the time of the infection as such being kept in a latest state. According to the storage system 20 as such described above, it is possible to determine timing when data corruption has begun, prevent valid data from being lost, and shorten working time required for data restoration.

By the way, the rebuild process illustrated in FIG. 10 may be modified by way of example as follows. If no abnormality has been found in data in the secondary volume at step S306, the processor 23 may re-specify the start time of invalidation changed to a date and time later than the time specified at step S302. Then, the processor may iterate processing of steps S303 to S306 and ask again the administrator to confirm whether restored data in the secondary volume is free of abnormality. As above, trying the restoration to data free of abnormality caused by malware infection, while updating the timing to start invalidating data updates made from the specified host (start time of invalidation), enables the restoration to data that has been stored the most immediately before the occurrence of the impact of malware infection. Thus, the differential included in data that is recovered back can be made as small as possible. Note that, while processing as above is executed, when abnormality has been found in data in the secondary volume, data copy to the primary volume should be performed using the logical-physical mapping of data in the secondary volume confirmed to be free of abnormality in the immediately preceding cycle of execution at step S307.

Figure 11:
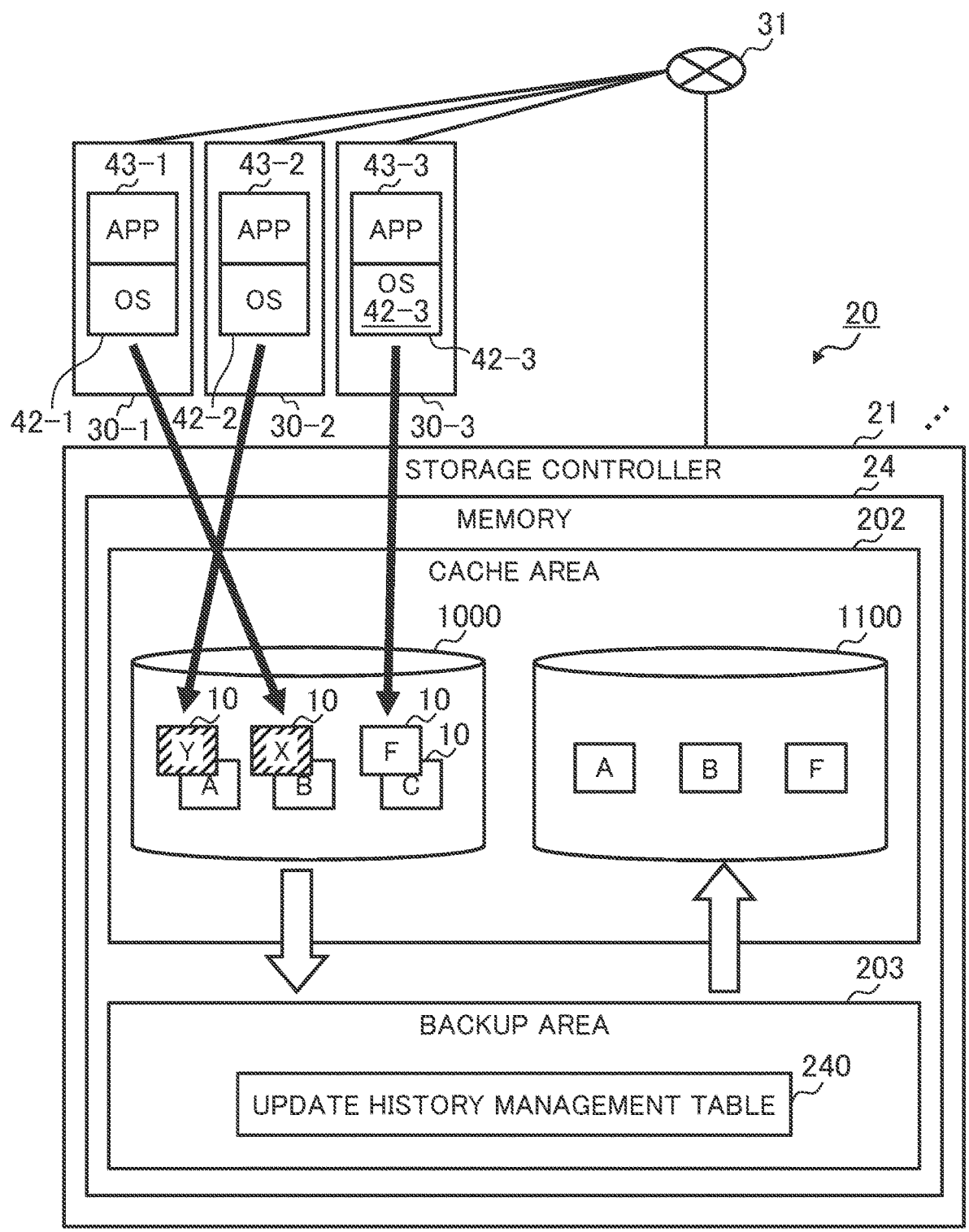
FIG. 11 is a diagram to explain one example (Part 3) of the image of restoring data by the storage system 20 in the present embodiment.

FIG. 11 is a diagram to explain one example (Part 3) of the image of restoring data by the storage system 20 in the present embodiment. FIG. 11 depicts a configuration example in which the storage system 20 is connected with a plurality of host nodes (host computers) 30. This configuration is arranged such that a destination of access from each host node 30 to a volume is not specified particularly.

To explain in detail, each host node 30 in FIG. 11 is capable of accessing a volume (P-VOL 1000) in the storage system 20 via a network 31 by functionality of an OS (Operation System) 42 and an application (APP) 43.

A description is provided below about the image of restoring data in the example of linkage in the storage system 20 depicted in FIG. 11. Note that, as for a part that is as similar as described with FIG. 1, its detailed description is omitted. Note that data X and Y are illegal data updated from hosts (host nodes 30-1 and 30-2) infected by malware and may be encrypted.

In FIG. 11, the P-VOL 1000 was initially storing data A, B, and C whose snapshot P was acquired. Then, it is assumed that a snapshot Q was acquired after a host node 30-1 was infected by malware and data B in the P-VOL 1000 was updated to data X by the host node 30-1. At this point of time, the P-VOL 1000 was storing data A, X and C. Then, it is assumed that a host node 30-2 was also infected by malware and data A in the P-VOL 1000 was updated to data Y by the host node 30-2. It is also assumed that a host node 30-3 not infected by malware updated data C in the P-VOL 1000 to data F in a healthy state. Therefore, the P-VOL 1000 is storing data Y, X, and F, finally.

In the final situation as above, supposing that it has been detected that the host nodes had been infected by malware, the storage system 20 restores the data in the P-VOL 1000 in such a manner that it selectively deletes the data Y and X updated from the host nodes 30-1 and 30-2 infected by malware to rectify the data in the volume.

Reviewing the rebuild process for performing such data restoration pursuant to the flowchart of FIG. 10, the administrator first specifies the host nodes 30-1 and 30-2 as the hosts for which to invalidate data updates at step S301. At the next step S302, the administrator specifies start time of invalidation of data updates by the specified hosts. In this example, it is assumed that, for example, time a little before the time of acquisition of the snapshot Q which is relatively new was specified. Note that different start times of invalidation for the host node 30-1 and the host node 30-2 as the specified hosts may be specified as will be described later as an example of modification to the first method, but it is assumed in this example that the administrator specified the same start time of invalidation.

At the next step S303, the processor 23 selects a snapshot to be set as the starting point of data restoration. In particular, the snapshot Q that was acquired most recently before the start time of invalidation is selected.

At the next step S304, the processor 23 distinguishes between data of the first category and data of the second category based on what was specified at steps S301 and S302 and also identifies the physical address of recovery data for the data of the first category using the snapshot selected at step S303. In detail, the processor 23 refers to the update history management table 240 and searches the update history records recorded within a period from the start time of invalidation until the current time with the key of the host that registered data 242, namely, the host node 30-1 or 30-2. Thereby, the processor distinguishes the data Y written as an update from the host node 30-2 as the data of the first category. Because an update from the data B to the data X by the host node 30-1 is performed before the start time of invalidation, the data X is not distinguished as the data of the first category at this point of time. Therefore, the data X and the data F are distinguished as the data of the second category. Then, for the data Y distinguished as the first category, the processor 23 searches the update history records for which the update history acquisition period 241 is from the acquisition time of the snapshot Q to the start time of invalidation in the update history management table 240 and identifies a physical address after update 246 in an update history record recorded at the shortest interval before the start time of invalidation for the data Y as the physical address of its recovery data. In particular, the recovery data that is retrieved in this case is the data A before being updated to the data Y written as an update by the host node 30-2 and its physical address is identified.

At the next step S305, the processor creates logical-physical mapping of data in a secondary volume (S-VOL 1100) based on the identified result at step S304 and others. Although the description of detailed processing of this step is omitted, data having a structure consisting of data A, X, and F is restored in the S-VOL 1100 as the result of step S305.

At the next step S306, the administrator is prompted to confirm whether the S-VOL 1100 in which the data was restored at step S305 is free of abnormality. Because this volume includes the data X, it is judged suffering from abnormality and the process returns to step S302. Then, at step S302, a specification is made again of the start time of invalidation changed to a date and time a little before the time of acquisition of the snapshot P older than the date and time last specified at step S302.

Subsequently, the foregoing processing is iterated. Specifically, by processing of step S303, the snapshot P is selected as the starting point of data restoration. Then, by processing of step S304, the data X written as an update by the host node 30-1 is newly distinguished as the data of the first category, the data B before being updated is retrieved as recovery data for the data X, and its physical address is identified. Furthermore, by processing of step S305, data having a structure consisting of data A, B, and F is restored in the S-VOL 1100.

Then, at step S306, the administrator is prompted again to confirm whether the S-VOL 1100 in which the data was restored at step S305 is free of abnormality. At this time, because deletion is made of both the data X and Y written as the updates from the host nodes 30-1 and 30-2 infected by malware, no abnormality is found in the S-VOL 1100. By copying the logical-physical mapping of the data in the S-VOL 1100 to the P-VOL 1000 at step S307, data restoration in the P-VOL 100 is implemented in such a manner that the processor selectively deletes the data corrupted by the hosts infected by malware.

As described hereinbefore, in either configuration where a destination of access is not specified on a per-host basis as in FIG. 1 and FIG. 11 and where a destination of access is specified on a per-host basis as in FIG. 7, when having been requested to restore (rebuild) volume data with the specifications of a host for which to invalidate data updates and the start time (date and time) of invalidation, the storage system 20 pertaining to the present embodiment identifies recovery data for each host that wrote a data update from pieces of data stored at a particular time at all logical addresses on the volume (data existing in the P-VOL 1000 as the current data and snapshots which are managed in the backup area 203) based on the update history management table 240 among others (particularly for data that has been written as an update by the specified host, data acquired most recently before the start time of invalidation is retrieved as its recovery data) and restores the data in the volume with the recovery data. According to the storage system 20 as such described above, it is possible to selectively restore data that is likely to be updated from a host infected by malware (a host designated for which to invalidate data updates) to data before the infection. Therefore, in the entire volume, data written as an update from a healthy host after the time of the infection can be restored without being deleted. In consequence, it is possible to prevent valid data from being lost and shorten working time required for data restoration.

By the way, the rebuild process by the first method described with reference to FIG. 10 and FIG. 11 may be modified by way of example as follows. At step S301, plural hosts may be specified as those for which to invalidate data updates. Additionally, at step S302, different start times of invalidation may be specified for each of the specified hosts. If different start times of invalidation are specified for each of the specified hosts, pieces of data of the first category are distinguished per specified host and each piece of data of the first category is restored to recovery data retrieved, i.e., data acquired most recently before the start time of invalidation specified per specified host. Besides, if different start times of invalidation are specified for each of the specified hosts, a snapshot to be set as the starting point of data restoration may be separately selected for each host based on the start time of invalidation specified per specified host or one common snapshot may be selected based on the start time of invalidation that is oldest between or among the start times of invalidation. According to the modification example as such described above, for each host specified, it is possible to invalidate data updates made after the start time of invalidation specified per host and make restoration to data before the data updates.

Besides, when specifications have been made of a host for which to invalidate data updates and the start time (date and time) of the invalidation, a second method of the rebuild process in the present embodiment is to restore data written as an update from the specified host after the specified date and time (without setting a snapshot as a starting point) to data in a state before the update using the update history management table 240.

A description is provided for the processing procedure of the rebuild process by the second method, explaining difference from the flowchart of FIG. 10. First of all, because this method does not set a snapshot as a starting point of data restoration, processing of step S303 is dispensed with. Then, at step S304, for all pieces of data in the current volume, the processor 23 distinguishes between data of the first category that needs to be restored with data before being updated and data of the second category that does not need to be restored with data before being updated and identifies the physical address of recovery data (data before being updated) to restore data of the first category. However, as a difference of the second method from the first method, when the processor 23 identifies recovery data to restore data of the first category at step S304, the processor 23 sets the current data in a latest state as the starting point of data restoration and searches through the update history management table 240 backward in time from the current data back to a point immediately before the start time of invalidation, thereby identifying the physical address of recovery data. More specifically, in the second method, for each piece of data included in the data of the first category, while referring to the update history management table 240, the processor 23 searches through update history records backward in time from the starting point of data restoration (data in a latest state, here), retrieves data before being updated at the first data update after the start time of invalidation as recovery data, and identifies its physical address. Then, by executing processing of step S305 and subsequent steps as done in the first method with the exception of processing using a snapshot, it is possible to restore the data of the first category with data before being updated immediately before the start time of invalidation. Besides, data of the second category is restored with the current data in a latest state, as is the case for the first method.

According to the second method as such described above, it is possible to restore data written from a host infected by malware to data before being updated without using a snapshot in a similar way to the first method. Therefore, the second method has an advantage that it can be implemented with simpler programming than for the first method, although processing time required to identify recovery data to restore data of the first category is longer than the first method.

Besides, the rebuild process by the second method may be modified by way of example as follows. The processor may select a snapshot acquired after the specified time (the start time of invalidation) and sets this snapshot as the starting point of data restoration. By searching through the update history management table 240 backward in time from the starting point, the processor may identify recovery data to restore data of the first category and its physical address and restore that data. As for data of the second category, the processor restores the current data in a latest state in the same way as in each of the foregoing methods and modifications thereof. According to the modification example as such described above, because data recovery is performed using a change difference from a snapshot, it is possible to reduce the time and load required for searching, as is the case for the first method.

Furthermore, while, in the foregoing context, the rebuild process by each of the foregoing methods restores data of the secondary category not updated by the specified host after the specified date and time (start time of invalidation) with the current data in a latest state, processing to restore data of the second category with a data structure of a given snapshot can be combined into this process. In this case, specifically, for example, at the start of the rebuild process, a date and time to restore data that means a target date and time to restore data (data of the second category) for which not to invalidate data updates are specified in addition to the specifications of a host (infected by malware) for which to invalidate data updates and the start time of invalidation of data updates (timing before the host is presumed to have been infected by malware). In consideration of practical operation, it is preferable that the target date and time to be specified as the date and time to restore data is a date and time later than the specified date and time to invalidate the data updates (the start time of the invalidation). Then, the processor 23 identifies a snapshot acquired most recently before the specified date and time as the date and time to restore data and restores data of the second category according to the data structure of the snapshot. Besides, the processor 23 restores data of the first category according to each of the foregoing methods. As an example of derivation, in the case of the method that uses a snapshot as the starting point of restoring data of the first category, a snapshot that is set as the starting point of restoring data of the second category may be applied commonly. Note that the date and time of acquisition of a desired snapshot may be specified directly instead of the foregoing date and time to restore data. According to the rebuild process as such described above, it is possible to restore data of the second category not written from a host infected by malware within volume data with a data structure of a snapshot acquired in close proximity to user desired timing (or a user desired snapshot) and to restore data of the first category written from a host infected by malware with data before the infection and, therefore, the rebuild process can meet various user demands regarding data restoration.

Besides, while the foregoing rebuild process has been described for a case where the additional write method is adopted as the data write method; even in a case where the previously mentioned method of saving an update difference is adopted, physical data before being updated remains without being erased and, therefore, this method can be used for data restoration in the build system, as with the additional write method.

The storage system 20 pertaining to the present embodiment can be applied in general to storage systems having a scheme in which pieces of data that are registered are classified in units of hosts (host computers, virtual machines, host node, containers, etc.) or management units of applications (volumes, persistent volumes, virtual disk images, etc.)

Note that the present invention is not limited to the foregoing embodiment and various modifications thereto are included. Specifically, for example, when restoring data of the P-VOL 1000, the rebuild process illustrated in FIG. 10 is arranged to restore data in the S-VOL 1100 once and, after prompting the user to confirm whether the data is free of abnormality, copy the structure of the restored data to the P-VOL 1000. This process may be modified by way of example to restore data directly in the P-VOL without restoring data in the S-VOL 1100. In the former case, secure data restoration can be expected by prompting the user to confirm data restored in another volume different from a volume that is used ordinarily. In the latter case, an advantageous effect of reducing time and labor required for data restoration can be expected, although security becomes inferior.

Besides, the foregoing embodiment has been described in detail to explain the present invention to make it easy to understand (clearly) and the invention is not necessarily limited to those including all components described. Besides, for a subset of the components of the embodiment, other components may be added to the subset or the subset may be removed or replaced by other components.

Furthermore, a subset or all of the aforementioned components, functions, processing units, processing means, etc. may be implemented by hardware; for example, inter alia, by designing an integrated circuit to implement them. Also, the aforementioned components, functions, etc. may be implemented by software in such a way that a processor interprets and executes programs that implement the respective functions. Information such as programs implementing the respective functions, tables, and files may be placed in a recording device such as a memory, a hard disk, or an SSD (Solid State Drive) or a recording medium such as an IC card, an SD card, or a DVD.

Besides, control lines and information lines which are considered as necessary for explanation are delineated and all control lines and information lines involved in a product are not necessarily delineated. Actually, almost all components may be considered to be interconnected.

What is claimed is:

1. A storage system comprising a storage device and a storage controller and providing volumes into which storage areas of the storage device are virtualized to a plurality of hosts by the storage controller, wherein
   the storage controller records history of data updates to data in the volumes made by the hosts as update history information with information that can identify each of the hosts; wherein
   when having been requested to restore data in a particular volume of the volumes with specifications of a host for which to invalidate data updates and a date and time to do so, based on the update history information, the storage controller invalidates data updates made by the specified host in the particular volume after the specified date and time, whereas keeping data updates valid made by a host different from the specified host in the particular volume after the specified date and time, and restores the particular volume; wherein
   the storage controller records a mapping relationship between a logical address allocated to each piece of data in a latest state in the volumes and a physical address where the each piece of data has been stored in the storage device as logical-physical mapping information with information that can identify each of the hosts that registered each piece of data; wherein
   when data in one of the volumes is updated, the storage controller stores data after being updated at a physical address in the storage areas different from a physical address where data before being updated was stored, updates the logical-physical mapping information, and, for at least a data update made by an access source host changed from another host, records a history record in the update history information in a form in which it is possible to trace access source hosts that changed from one to another and logical and physical address pairs for each of data before being updated and data after being updated; wherein
   when having been requested to restore data in the particular volume, the storage controller identifies data of a first category written as an update by the specified host after the specified date and time from among the data in the particular volume, based on the update history information; wherein
   in relation to a logical address allocated to each piece of data of the first category, the storage controller identifies a most recent physical address allocated to data after being updated by a data update performed before the specified date and time, based on the update history information; and wherein
   the storage controller maps the identified physical address allocated to the data after being updated to the logical address and restores the data of the first category.

2. The storage system according to claim 1 wherein: when having been requested to restore data in the particular volume, the storage controller identifies data of a second category not updated by the specified host after the specified date and time from among the data in the particular volume as well as identifying the data of the first category, based on the update history information; and the storage controller restores the data of the second category in a latest state, based on the update history information or the logical-physical mapping information.

3. The storage system according to claim 1 wherein: the storage controller iteratively acquires snapshots of the volumes at predetermined timing intervals; and when having been requested to restore data in the particular volume, the storage controller selects a snapshot acquired before the specified date and time as a starting point of restoration of the data of the first category and identifies recovery data to restore the data of the first category from among data stored in the storage device by identifying an update difference that has changed a physical address of the data of the first category from the starting point until the specified date and time using the update history information.

4. The storage system according to claim 1 wherein: when plural hosts for which to invalidate data updates and different dates and times to do so have been specified in a request to restore data in the particular volume, the storage controller identifies the data of the first category for each host specified based on each of the dates and times specified for the each host and restores the data of the first category with data after being updated by a data update performed before the each of the specified dates and times.

5. The storage system according to claim 1 wherein: when having been requested to restore data in the particular volume, the storage controller selects data in a latest state given in the logical-physical mapping information as a starting point of restoration of the data of the first category and identifies recovery data to restore the data of the first category from among data stored in the storage device by identifying an update difference that has changed a physical address of the data of the first category from the starting point until the specified date and time using the update history information.

6. The storage system according to claim 1 wherein: the storage controller iteratively acquires snapshots of the volumes at predetermined timing intervals; and when having been requested to restore data in the particular volume, the storage controller selects a snapshot acquired after the specified date and time as a starting point of restoration of the data of the first category and identifies recovery data to restore the data of the first category from among data stored in the storage device by identifying an update difference that has changed a physical address of the data of the first category from the starting point until the specified date and time using the update history information.

7. The storage system according to claim 1 wherein: the storage controller iteratively acquires snapshots of the volumes at predetermined timing intervals; when a target date and time to restore data for which not to invalidate data updates besides the specifications of a host for which to invalidate date updates and a date and time to do so, the storage controller identifies the data of the second category not updated by the specified host after the specified date and time from among the data in the particular volume as well as identifying the data of the first category, based on the update history information; and the storage controller restores the data of the second category using a snapshot acquired before the target date and time.

8. The storage system according to claim 1 wherein: when having been requested to restore data in a first volume, the storage controller restores the data in a second volume different from the first volume and requests a user to confirm whether the second volume stores properly restored data; and if it has been confirmed by the user that the data has been restored properly in the second volume, the storage controller copies the data structure in the second volume to the first volume, thereby restoring the data in the first volume.

9. The storage system according to claim 8, wherein:
if it has been confirmed by the user that the data restored in the secondary volume suffers from abnormality, the storage controller changes the specified date and time to a date and time earlier than the specified date and time, iterates a process of restoring the data in the second volume until it is confirmed by the user that the data restored in the second volume is normal, and copies the data structure in the second volume at the end of the iteration to the first volume, thereby restoring the data in the first volume.

10. The storage system according to claim 8 wherein:
if it has been confirmed by the user that the data restored in the second volume is normal, the storage controller changes the specified date and time to a date and time later than the specified date and time, iterates a process of restoring the data in the second volume until it is confirmed by the user that the data restored in the second volume is abnormal, copies the data structure in the second volume when the data has been confirmed to be normal immediately before the end of the iteration to the first volume, thereby restoring the data in the first volume.

11. The storage system according to claim 1 wherein:
when data management areas of the volumes are each divided into a plurality of independent virtual disk images and the hosts that can get access to each of the virtual disk images are registered in advance,
the storage controller records history of data updates to the virtual disk images made by the hosts as update history information with information that can identify each of the hosts; and
when having been requested to restore data in a particular volume of the volumes with specifications of a host for which to invalidate data updates and a date and time to do so, based on the update history information, the storage controller invalidates data updates made by the specified host in one of the virtual disk images to be accessed from the specified host after the specified date and time, whereas keeping data updates valid made in one of the virtual disk images to be accessed from a host different from the specified host, and restores data in the virtual disk images.

12. A data restoration method that is performed by a storage system comprising a storage device and a storage controller and providing volumes into which storage areas of the storage device are virtualized to a plurality of hosts by the storage controller, the data restoration method comprising:

an update history recording step in which the storage controller records history of data updates to data in the volumes made by the hosts as update history information with information that can identify each of the hosts; and a data restoring step in which, when having been requested to restore data in a particular volume of the volumes with specifications of a host for which to invalidate data updates and a date and time to do so, based on the update history information, the storage controller invalidates data updates made by the specified host in the particular volume after the specified date and time, whereas keeping data updates valid made by a host different from the specified host in the particular volume after the specified date and time, and restores the particular volume, wherein the storage controller records a mapping relationship between a logical address allocated to each piece of data in a latest state in the volumes and a physical address where the each piece of data has been stored in the storage device as logical-physical mapping information with information that can identify each of the hosts that registered each piece of data; wherein when data in one of the volumes is updated, the storage controller stores data after being updated at a physical address in the storage areas different from a physical address where data before being updated was stored, updates the logical-physical mapping information, and, for at least a data update made by an access source host changed from another host, records a history record in the update history information in a form in which it is possible to trace access source hosts that changed from one to another and logical and physical address pairs for each of data before being updated and data after being updated; wherein when having been requested to restore data in the particular volume, the storage controller identifies data of a first category written as an update by the specified host after the specified date and time from among the data in the particular volume, based on the update history information; wherein in relation to a logical address allocated to each piece of data of the first category, the storage controller identifies a most recent physical address allocated to data after being updated by a data update performed before the specified date and time, based on the update history information; and wherein the storage controller maps the identified physical address allocated to the data after being updated to the logical address and restores the data of the first category.

* * * * *